United States Patent
Dagan et al.

(10) Patent No.: US 6,815,929 B1
(45) Date of Patent: Nov. 9, 2004

(54) SYSTEM AND METHOD FOR BATTERY ISOLATION IN A CHARGING SYSTEM

(75) Inventors: Marc E. Dagan, Mountain View, CA (US); Sergei Slavnov, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/795,154

(22) Filed: Mar. 4, 2004

(51) Int. Cl.[7] .................................................. H02J 7/00

(52) U.S. Cl. ....................................... 320/121; 320/146

(58) Field of Search ................................. 320/121, 107, 320/134, 146, 153; 324/426–432; 323/282

(56) References Cited

U.S. PATENT DOCUMENTS 5,136,231 A * 8/1992 Faulk .......................... 320/134
5,315,253 A * 5/1994 Alexandres et al. ......... 324/429

OTHER PUBLICATIONS

Analog Devices "High Frequency Switch Mode Dual Li–Ion Battery Chargers, ADP3801/ADP3802", pp. 1–20 (1998).
Analog Devices "GSM Power Management System, ADP3408", pp. 1–20, (2002).

* cited by examiner

Primary Examiner—Pia Tibbits
(74) Attorney, Agent, or Firm—Koppel, Jacobs, Patrick & Heybl

(57) ABSTRACT

A system and method for battery isolation in a charging system includes an isolation diode connected to a charger input voltage and a PNP pass transistor connected in series between the isolation diode and a battery. The pass device conducts a charging current in response to a drive signal applied to its base; the pass transistor side of the diode is at a voltage $V_{chg}$. A first switch couples the pass transistor's base to $V_{chg}$ when $V_{chg} > V_{bat}$ such that the pass transistor's base-collector junction blocks current from $V_{chg}$ from flowing through the pass transistor when the charger is not in use, and a second switch couples the base to $V_{bat}$ when $V_{bat} > V_{chg}$ such that the pass transistor's base-emitter junction blocks current from the battery from flowing through the pass transistor when the charger is not in use.

18 Claims, 3 Drawing Sheets

SYSTEM AND METHOD FOR BATTERY ISOLATION IN A CHARGING SYSTEM

BACKGROUND OF THE INVENTION

1. Field of the Invention

This invention relates to the field of battery charging circuits, and particularly to methods of blocking current flow from a charged battery when the charging circuit is not in use.

2. Description of the Related Art

A Conventional battery charging circuit is shown in FIG. 1. A charger supply voltage $V_{supply}$ is provided to the charging circuit at a charger voltage input terminal 8. The charging circuit provides a charging current to a rechargeable battery 10 connected to a battery connection terminal 12; the voltage across the battery is designated $V_{bat}$. A pass device, typically a PNP transistor Q1, is connected between $V_{supply}$ and battery connection terminal 12, and conducts the charging current in response to a control signal applied at Q1's base. The charging circuit typically includes an isolation diode 14 connected in series between $V_{supply}$ and Q1 (with the voltage on the cathode side of diode 14 being "$V_{chg}$"), and a blocking diode 16 connected in series between Q1 and battery connection terminal 12. Control circuits such as a charge current sense circuit 18, a battery voltage sense circuit 20, and a pass device drive circuit 22 complete the charging circuit.

Isolation diode 14 is necessary to prevent damage to the charging circuit in case a voltage having a reverse polarity is inadvertently applied to charger voltage input terminal 8, and to prevent $V_{bat}$ from being present on the input terminal when $V_{supply}$ is not present.

Blocking diode 16 is needed to prevent reverse conduction of the pass device. Reverse conduction could occur, for example, if the charging voltage never exceeds the battery voltage. If this occurs, battery voltage $V_{bat}$, through the parasitic base-collector diode of a PNP pass device (or body diode of a MOSFET pass device), could bias up the charger control circuits; thereby gradually draining the battery.

A conventional battery charging circuit also typically includes a means of holding the pass device off when the charger is not in use. This may be accomplished, for example, by connecting a resistor 24 or a switch between Q1's base and emitter. There are several situations in which it is important to hold Q1 off when the charger is not in use. For example, in some applications—charging a lithium ion (Li+) battery, for example—when the charger must not continue to provide current to the battery after charging is complete. The pass device is held off to effect this. Also, the charger must not attempt to charge a battery when $V_{chg}<V_{bat}$. Isolation diode 14 would prevent $V_{bat}$ from appearing on charger voltage input terminal 8, but the system should also hold Q1 off to prevent control circuits on the $V_{supply}$ side of the charging circuit from draining the battery. This is also true if $V_{supply}$ is not present at all.

The configuration shown in FIG. 1 suffers from several drawbacks, however. The charging circuit requires two diodes, which can be costly. In addition, $V_{supply}$ must be at least two diode drops above $V_{bat}$ to maintain charging. This increases power consumption, and forces $V_{supply}$ to be at a higher voltage than might be desirable.

SUMMARY OF THE INVENTION

A system and method for battery isolation in a charging system is presented, which overcomes the problems noted above. The invention enables the charger circuit's current consumption to be zero when not in use, eliminates the need for a blocking diode, and reduces power consumption and charger supply voltage required to maintain charging.

The present battery charging system and method include a charger voltage input terminal for connection to a charger supply voltage $V_{supply}$, an isolation diode connected to the charger voltage input terminal, and a PNP pass transistor connected in series between the isolation diode and a battery connection terminal and which conducts a charging current in response to a drive signal applied to its base; the pass transistor side of the diode is at a voltage $V_{chg}$. The current charges a battery connected to the battery connection terminal; the voltage across the battery is designated $V_{bat}$.

The system also includes a first switch arranged to couple the pass transistor's base to $V_{chg}$ when closed in response to a first control signal, and a second switch arranged to couple the base to $V_{bat}$ when closed in response to a second control signal. A controller provides the first and second control signals to the switches. The first switch is closed and the second switch is opened when $V_{chg}>V_{bat}$, such that the pass transistor's base-collector junction blocks current from a charger supply voltage from flowing through the pass transistor when the charger is not in use. The second switch is closed and the first switch is opened when $V_{bat}>V_{chg}$ such that the pass transistor's base-emitter junction blocks current from a battery connected to the battery connection terminal from flowing through the pass transistor when the charger is not in use. Thus, when the system is not charging or the charging supply is low or not present, the PNP acts as a blocking diode to prevent the battery voltage from appearing on the charger supply side of the pass transistor and providing bias to the charger controller circuitry.

Further features and advantages of the invention will be apparent to those skilled in the art from the following detailed description, taken together with the accompanying drawings.

DETAILED DESCRIPTION OF THE INVENTION

Figure 1:
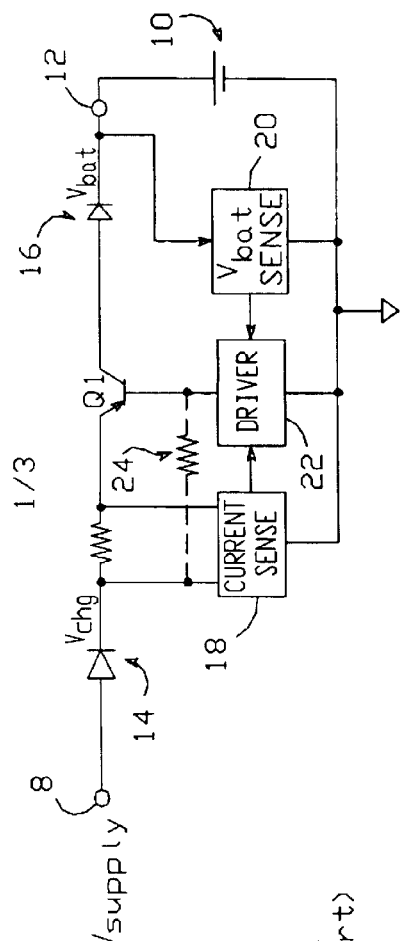
FIG. 1 is a block/schematic diagram of a known battery charging system.
Figure 2:
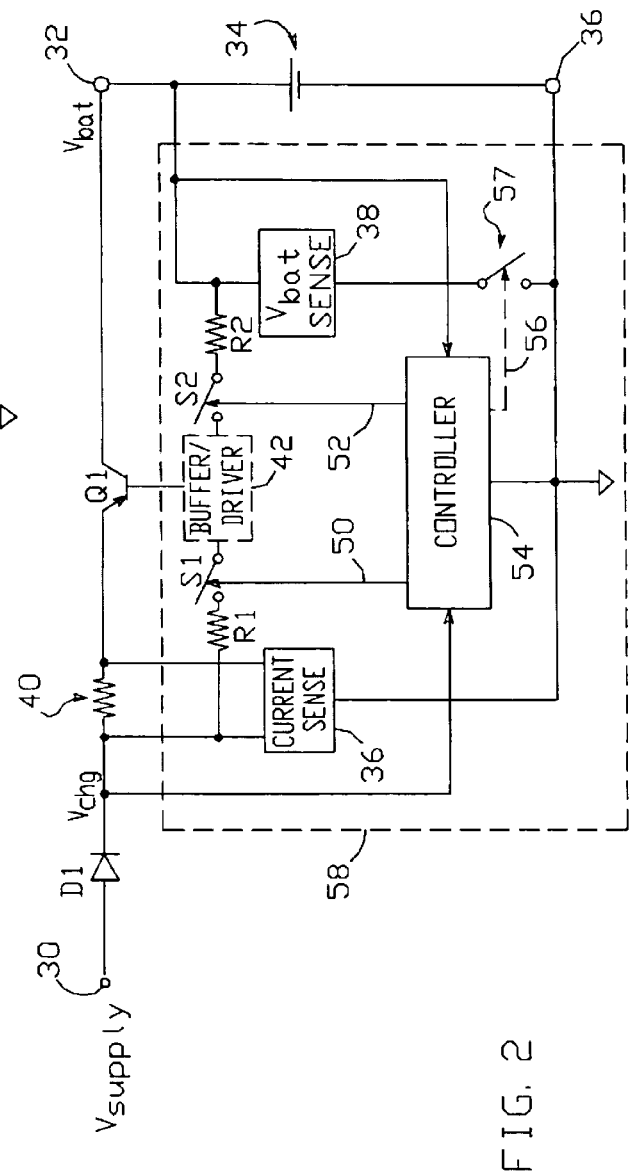
FIG. 2 is a block/schematic diagram of a battery charging system per the present invention.

A battery charging system which isolates the battery when the system is not in use is shown in FIG. 2. The system includes a charger voltage input terminal 30 for connection to a charger supply voltage $V_{supply}$, an isolation diode D1 connected in series with the input terminal 30, and a PNP pass transistor Q1 connected between D1 and a battery connection terminal 32 which conducts a current between its emitter and collector in response to a drive signal applied to its base. The voltage on the cathode side of D1 is designated $V_{chg}$. A battery 34 to be charged would be connected between battery connection terminal 32 and a charger return terminal 36. When charging a battery, a drive signal is applied to Q1's base to produce a desired charging current, which charges battery 34; the voltage across the battery is designated $V_{bat}$.

A typical battery charger circuit will include circuitry 36 on the "supply side" of the pass transistor—i.e., coupled to Q1's emitter side, and circuitry 38 on the "battery side"— i.e., coupled to Q1's collector. Circuitry 36 might include, for example, a current sense amplifier connected across a sense resistor 40 for monitoring the current through Q1, one or more comparators, bias networks, etc. Circuitry 38 might include, for example, a voltage sense amplifier connected to monitor $V_{bat}$, a resistive divider, one or more comparators, etc. The charger circuit may also include a buffer or driver circuit 42, connected to circuitry 36, circuitry 38, or both, which provides a drive signal to Q1.

When the charger is not in use, it is imperative that the charger circuitry (e.g., 36, 38) not consume current from a battery connected to battery connection terminal 32—to avoid discharging the connected battery. The invention prevents this problem by connecting the base of Q1 to the higher of battery voltage $V_{bat}$ and a supply side voltage which varies directly with $V_{supply}$—preferably $V_{chg}$. This is accomplished with the use of two switches: a switch S1 coupled between the base of Q1 and $V_{chg}$, and a switch 52 coupled between the base of Q2 and $V_{bat}$. S1 and S2 are connected to $V_{chg}$ and $V_{bat}$ via resistances R1 and R2, respectively, which may be discrete resistors or resistances inherent in the implementation of switches S1 and S2.

Switches S1 and S2 operate in response to respective control signals 50 and 52, produced by a controller 54. Controller 54 is arranged to close switch S2 and open S1 when $V_{bat}>V_{chg}$, thereby coupling $V_{bat}$ to the base of Q1. This prevents current from flowing from battery 34 to circuitry 36 on the supply side of the charger. Since $V_{bat}>V_{chg}$, connecting Q's base to $V_{bat}$ firmly reverse-biases the emitter-base diode inherent in Q1, which then acts as a blocking diode and blocks the reverse-conduction of battery current through the pass device.

When $V_{chg}>V_{bat}$, controller 54 is arranged to close switch S1 and open S2, thereby coupling $V_{chg}$ to the base of Q1. This prevents current from flowing from the supply side to circuitry 38 and battery 34 on the battery side of the charger when the charger is not in use. Since $V_{chg}>V_{bat}$, connecting Q1's base to $V_{chg}$ firmly reverse-biases the base-collector diode inherent in Q1 and blocks the flow of battery current through the pass device.

In addition to enabling Q1 to do the job of a blocking diode, the invention also serves to hold Q1 off when the charger is not in use. There are several conditions for which the charger would typically be off. For example, when charging is complete, the charger should not continue to provide current to the battery—particular if the battery is a lithium ion-type. In this case, $V_{chg}$ will be greater than $V_{bat}$, such that S1 will be closed and Q1 held off.

If $V_{chg}<V_{bat}$, or if the charger supply voltage is removed or zero, the charger should also be off, to prevent circuitry on the supply side of the charger from draining the battery. Here, S2 will be closed and Q1 is held off.

Switches S1 and S2 are preferably implemented with field-effect transistors (FETs). However, alternative implementations are also possible: for example, S1 and S2 might be implemented with current sources that are enabled and disabled with respective control signals, which, when enabled, pull the base of Q1 up to $V_{chg}$ or $V_{bat}$, respectively.

Controller 54 can also be arranged to provide control signals used to disable or disconnect other circuits which might otherwise draw power from the battery. For example, circuitry 38 typically includes a resistive divider connected between Vbat and ground, which attenuates the battery voltage so that it can be compared to a reference voltage. This divider must be disconnected when the charger is not in use to avoid draining the battery. Therefore, when a condition which calls for the charger to be off is detected (such as when charging is complete) controller 54 preferably provides a control signal 56 which operates a switch 57 arranged to prevent current flow through the divider. Similar disconnection schemes could be used wherever necessary.

When arranged as described above, the invention enables the charger circuitry to consume zero current when not in use. The invention eliminates the need for a blocking diode, thereby reducing costs when compared with prior art configurations. In addition, eliminating the voltage drop that occurs when a blocking diode is present enables charging to be maintained with a lower charger input voltage ($V_{supply}$).

The charger's drive and control circuitry, as well as switches S1 and S2, are preferably packaged together as an integrated circuit 58, with isolation diode D1, sense resistor 40, and pass transistor Q1 being external to the IC.

Note that, though switch S1 is described herein as preferably coupled to voltage $V_{chg}$, it may alternatively be connected to another supply side voltage that varies with $V_{supply}$—or even $V_{supply}$ itself.

Figure 3:
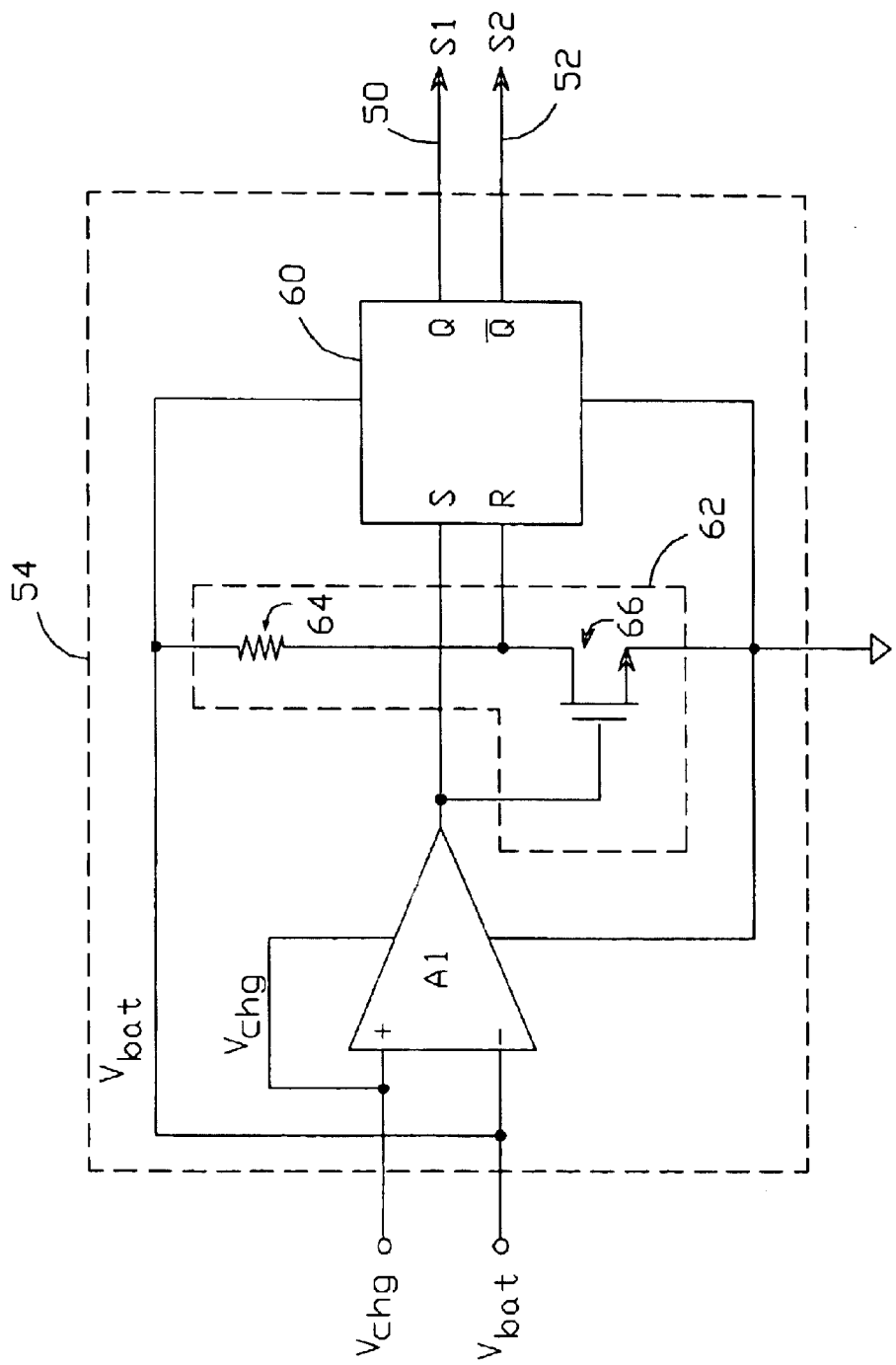
FIG. 3 is a schematic diagram of a controller as might be used with a battery charging system per the present invention.

One possible implementation of controller 54 is shown in FIG. 3. A comparator A1 receives $V_{chg}$ and $V_{bat}$ at its non-inverting and inverting inputs, respectively. The output of A1 is connected to the set input of an S-R latch 60, and an inverter 62—preferably implemented with a resistor 64 and a FET 66—provides the complement of A1's output to the latch's reset input. The latch's Q and $\overline{Q}$ outputs provide control signals 50 and 52 to switches S1 and S2, respectively (assuming that S1 and S2 are arranged such that a logic "1" closes the switch).

Comparator A1 is preferably biased from $V_{chg}$, and inverter 62 is preferably biased with $V_{bat}$. Then, if $V_{chg}$ is zero or low, A1 outputs a logic "0" to the latch's set input, and inverter 62 outputs a logic "1" to the latch's reset input. This closes S2 and connects the base of Q1 to $V_{bat}$. This is the "default" zero bias state. Latch 60 is preferably arranged such that its logic draws no current unless the latch is changing state.

Note that controller 54 might alternatively be implemented without latch 60. A latch aids in providing the controller with a zero current implementation, but the controller might also be implemented with a comparator alone.

There is preferably some offset and hysteresis associated with the determination of $V_{chg}>V_{bat}$ and $V_{chg}<V_{bat}$; for example: $V_{chg}>V_{bat}+200$ mV when $V_{bat}$ is rising, and $V_{chg}<V_{bat}+50$ mV when the charger voltage is falling. Hysteresis prevents the comparator output from "chattering" or bouncing, as $V_{chg}$ and $V_{bat}$ are usually very slow moving signals and it is good practice to prevent noise from producing spurious changes in the output. Offset protects against an erroneous decision in the event that input supply voltage $V_{supply}$ decays to close to $V_{bat}$ during charging; i.e., when Q1 is passing current to charge the battery.

To illustrate the problem that offset improves, consider the following sequence of events:

i) Comparator A1 makes its decision nominally at zero offset, though for some population of finished systems, the comparator threshold will be $V_{chg}>V_{bat}-Vos$ (due to random manufacturing offset).

ii) $V_{chg}$ approaches $V_{bat}$, gradually becoming equal to or less than $V_{bat}$, such that current can no longer flow to the battery.

iv) Since the comparator's offset is negative, the comparator doesn't flip yet.

v) The control loops attempt to drive Q1 on harder, since no current is flowing.

vi) Q1 is on hard, which applies $V_{bat}$ to the emitter side of the PNP, and Q1 now conducts in reverse.

vii) Since $V_{chg}$ is held to $V_{bat}$ by Q1, comparator A1 never flips.

viii) The battery is drained rapidly through the base drive to Q1 and the bias to the IC.

By adding some positive offset, when $V_{chg}=V_{bat}$ and current cannot flow into the battery, as in v) above, the comparator has already tripped and shut the system down. Note that added offset must safely exceed the offsets produced by random manufacturing mismatches and/or systematic voltage drops like the saturation voltage of Q1.

Figure 4:
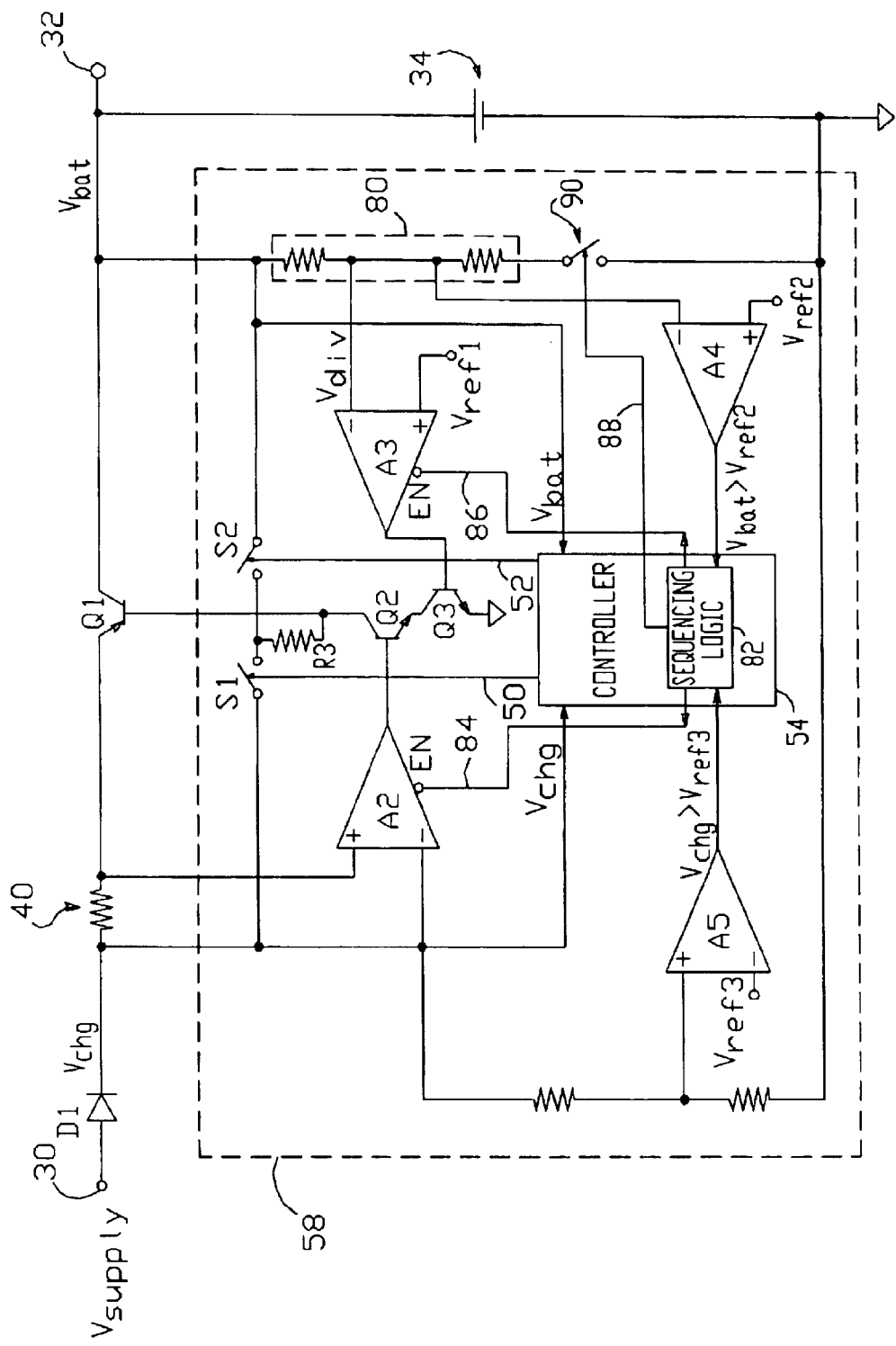
FIG. 4 is a block/schematic diagram of a preferred embodiment of a battery charging system per the present invention.

A block diagram of a preferred embodiment of the present battery charging system is shown in FIG. 4. Here, a current sense amplifier A2 monitors the voltage across a current sense resistor 40, and a voltage sense amplifier A3 produces an output which varies with the difference between a reference voltage $V_{ref1}$ and a voltage $V_{div}$ produced by attenuating $V_{bat}$ with a divider 80. In this exemplary embodiment, the outputs of A2 and A3 drive transistors Q2 and Q3, respectively, which are connected in series and conduct Q1's drive current when the system is charging a battery 34 connected to battery connection terminal 32.

As before, switch S1 is connected between $V_{chg}$ and Q1's base, and S2 is connected between $V_{bat}$ and Q1's base. Controller 54 produces control signals 50 and 52 to switches S1 and S2: S2 is closed and S1 opened when $V_{bat}>V_{chg}$ (thereby coupling $V_{bat}$ to the base of Q1), and S1 is closed and S2 opened when $V_{chg}>V_{bat}$ (thereby coupling $V_{chg}$ to the base of Q1). Here, resistors R1 and R2 are consolidated into a single resistor R3. When the charging system is configured as shown, one of S1 or S2 is always closed. R3 serves as a pullup resistor for the drive stage, and is connected to $V_{chg}$ or $V_{bat}$, whichever is higher.

The system preferably also includes circuitry for detecting conditions under which the charger's control loops and drive circuitry should be off. For example, when charging is complete, the charger should not continue to provide current to the battery. This is detected with a comparator A4 which compares $V_{div}$ with a reference voltage $V_{ref2}$, with $V_{ref2}$ selected such that the output of A4 toggles when the battery voltage indicates that charging is complete. The output of A4 is provided to a sequencing logic block 82 within controller 54, which produces outputs (84, 86, 88) that disable the drive circuitry (A2, A3) and open switches (90) to reduce the charger system's current consumption to a minimum.

Note that the conditions noted above are merely exemplary; these and/or other conditions may be monitored and use to enable or disable the charger circuit as appropriate. For example, the charging current might also be monitored to detect when it has dropped below a certain threshold, with sequencing logic 82 arranged to disable the charger circuitry when $V_{bat}$ exceeds and the charging current falls below respective thresholds.

Similarly, if the charger supply voltage is removed or too low, the charger should be off. This is detected with a comparator A5, which compares a voltage representative of $V_{chg}$ with a reference voltage $V_{ref3}$. If $V_{chg}$ is too low, the output of A5 triggers sequencing logic 82 to disable the drive circuitry and open switches as necessary to reduce the charger system's current consumption to a minimum.

As in FIG. 2, the charger's drive and control circuitry, as well as switches S1 and S2, are preferably packaged together as an integrated circuit 58, with isolation diode D1, sense resistor 40, and pass transistor Q1 being external to the IC.

Preferably, control loop amplifiers such as A2 and A3 have class A-type output stages, such that resistor R3 (or resistors R1 and R2), and the base current of Q1 serve as the load for the amplifiers, common source/emitter outputs.

As noted above, with this circuit configuration, either S1 or S2 is closed at all times, whether the other charger circuitry is enabled or disabled. Alternatively, the system could be configured such that neither switch is closed when the charger is in use. However, this would require that the amplifiers have pull-up capability, and the switchover between amplifier control and the disable switches may be prone to glitches.

A battery charging system as described herein may be implemented in many different ways; the implementations shown are merely exemplary. It is only essential that the system employ a bipolar pass transistor, and that the pass transistor be used to emulate a blocking diode by connecting its base to $V_{bat}$ when $V_{bat}>V_{chg}$ and to $V_{chg}$ when $V_{chg}>V_{bat}$.

While particular embodiments of the invention have been shown and described, numerous variations and alternate embodiments will occur to those skilled in the art. Accordingly, it is intended that the invention be limited only in terms of the appended claims.

We claim:

1. A battery charging system, comprising:

a charger voltage input terminal for connection to a charger supply voltage $V_{supply}$;

a battery connection terminal for connection to a battery having a voltage $V_{bat}$ across it;

an isolation diode having its anode connected to said charger voltage input terminal and having a voltage $V_{chg}$ at its cathode;

a PNP pass transistor which conducts a current between its emitter and collector in response to a drive signal applied to its base, said emitter-collector circuit connected in series between said cathode and said battery connection terminal;

a first switch and a first resistance connected in series between a voltage V1 that varies directly with $V_{supply}$ and said PNP's base and arranged to couple said base to V1 when closed, said first switch opened and closed in response to a first control signal;

a second switch and a second resistance connected in series between $V_{bat}$ and said PNP's base and arranged to couple said base to $V_{bat}$ when closed; said second switch opened and closed in response to a second control signal;

a controller arranged to provide said first and second control signals to close said first switch and open said second switch when V1>$V_{bat}$ such that said pass transistor's base-collector junction blocks current from a charger supply voltage connected to said charger voltage input terminal from flowing through said pass device when said charging system is not charging a battery, and to close said second switch and open said first switch when $V_{bat}$>V1 such that said pass transistor's base-emitter junction blocks current from a battery connected to said battery connection terminal from flowing through said pass device when said charging system is not charging a battery.

2. The battery charging system of claim 1, wherein said first and second resistances are the inherent resistances of said first and second switches, respectively.

3. The battery charging system of claim 1, wherein said first and second resistances are discrete resistors.

4. The battery charging system of claim 1, wherein said first switch has a first terminal connected to V1 and a second terminal, and said second switch has a first terminal connected to $V_{bat}$ and a second terminal, the second terminals of said first and second switches connected together at a common switch node, and said first and second resistances comprise a single resistor connected between said PNP's base and said common switch node.

5. The battery charging system of claim 1, further comprising one or more driver circuits coupled to said PNP's base and arranged to, when enabled, apply said drive signal to said base, to produce a desired battery voltage $V_{bat}$ at said battery connection terminal.

6. The battery charging system of claim 5, further comprising sequencing logic which includes circuitry for detecting conditions under which said charging system should be shut down, said sequencing logic disabling said driver circuits when any of said conditions are detected.

7. The battery charging system of claim 5, wherein said first switch has a first terminal connected to V1 and a second terminal, and said second switch has a first terminal connected to $V_{bat}$ and a second terminal, the second terminals of said first and second switches connected together at a common switch node, said first and second resistances comprising a single resistor connected between said PNP's base and said common switch node, and wherein said driver circuits have class A-type output stages and said single resistor serves as a pullup resistor for said output stages.

8. The battery charging system of claim 1, wherein V1 is charger supply voltage $V_{supply}$.

9. The battery charging system of claim 1, wherein V1 is isolation diode cathode voltage $V_{chg}$.

10. The battery charging system of claim 1, wherein said first and second switches are respective field-effect transistors (FETs).

11. The battery charging system of claim 1, wherein said first and second switches are respective current sources.

12. The battery charging system of claim 1, wherein said controller comprises a comparator, the inputs of which are coupled to V1 and $V_{bat}$ and which produces an output having a first state when V1>$V_{bat}$ and a second state when $V_{bat}$>V1, said controller arranged such that said first and second control signals vary with said comparator output.

13. The battery charging system of claim 12, wherein said comparator has associated offset and hysteresis characteristics such said comparator output changes to said first state when V1>$V_{bat}$+x mv and said comparator output changes to said second state when V1<$V_{bat}$+y mv, where x and y represent said associated offset and hysteresis characteristics.

14. The battery charging system of claim 12, further comprising a latch circuit which receives said comparator output and has true and complement outputs, said latch circuit latched into a first state when V1>$V_{bat}$ and latched into a second state when $V_{bat}$>V1, said true and complement outputs being said first and second control signals.

15. The battery charging system of claim 14, wherein said comparator and latch circuit have respective supply voltage inputs, said comparator's supply voltage input coupled to V1 and said latch's supply voltage input coupled to $V_{bat}$.

16. The battery charging system of claim 14, wherein said latch circuit comprises:
 a set-reset latch having Q and $\overline{Q}$ outputs, said latch's set input connected to said-comparator output; and
 an inverter, the input of which is connected to said comparator output and the output of which is connected to said latch's reset input.

17. The battery charging system of claim 16, wherein said inverter comprises a transistor having its control input connected to said comparator output and its current circuit connected between said latch's reset input and a common terminal; and
 a resistor connected between $V_{bat}$ and said latch's reset input.

18. A method of preventing current flow through a battery charging circuit's PNP pass device when said charging circuit is not charging a battery, said pass device's collector-emitter circuit connected between a charger voltage $V_{chg}$ and a battery having a voltage $V_{bat}$ across it, comprising:
 determining the greater of $V_{chg}$ and $V_{bat}$; and
 connecting the base of said PNP pass device to the greater of $V_{chg}$ and $V_{bat}$ such that said pass transistor's base-collector junction blocks current from $V_{chg}$ from flowing through said pass device when $V_{chg}$>$V_{bat}$ and said charging circuit is not charging a battery, and said pass transistor's base-emitter junction blocks current from $V_{bat}$ from flowing through said pass device when $V_{bat}$>$V_{chg}$ and said charging circuit is not charging a battery.

* * * * *